US006992572B1

(12) United States Patent
Lovegrove

(10) Patent No.: US 6,992,572 B1
(45) Date of Patent: Jan. 31, 2006

(54) DIRECTION INDICATOR SYSTEM

(75) Inventor: David Lovegrove, Christchurch (NZ)

(73) Assignee: Gary Fraser Bevin, Wellington (NZ)

( * ) Notice: Subject to any disclaimer, the term of this patent is extended or adjusted under 35 U.S.C. 154(b) by 0 days.

(21) Appl. No.: 10/978,159

(22) Filed: Oct. 29, 2004

(51) Int. Cl.
*B62J 6/00* (2006.01)

(52) U.S. Cl. ...................... 340/432; 340/321; 340/465; 340/475; 340/686.6; 362/473

(58) Field of Classification Search ............... 340/321, 340/432, 463, 468, 686.1, 686.6, 475, 476; 362/473, 476
See application file for complete search history.

(56) References Cited

U.S. PATENT DOCUMENTS

| 1,391,243 | A | * | 9/1921 | Carpenter | 200/183 |
| 1,519,266 | A | * | 12/1924 | Roebling | 340/321 |
| 1,556,860 | A | * | 10/1925 | Lovaas | 340/321 |
| 1,601,539 | A | * | 9/1926 | Patton et al. | 340/321 |
| 1,691,400 | A | * | 11/1928 | Mitchell | 200/61.59 |
| 2,172,167 | A | * | 9/1939 | Leventhal | 200/61.52 |
| 4,618,822 | A | * | 10/1986 | Hansen | 324/207.16 |
| 5,047,750 | A | * | 9/1991 | Hector | 340/573.4 |
| 6,265,984 | B1 | * | 7/2001 | Molinaroli | 340/815.4 |
| 6,404,409 | B1 | * | 6/2002 | Solomon | 345/31 |
| 6,529,121 | B2 | * | 3/2003 | Bush | 340/326 |
| 6,679,615 | B2 | * | 1/2004 | Spearing | 362/103 |
| 6,720,870 | B2 | * | 4/2004 | Morse | 340/468 |
| 2003/0062996 | A1 | * | 4/2003 | Flanagan et al. | 340/457 |
| 2004/0036585 | A1 | * | 2/2004 | Kitamura et al. | 340/432 |

* cited by examiner

*Primary Examiner*—Jeffery Hofsass
*Assistant Examiner*—Anne V. Lai
(74) *Attorney, Agent, or Firm*—William F. Lang, IV; Arnold B. Silverman; Eckert Seamans Cherin & Mellott, LLC

(57) ABSTRACT

A direction indicator system and associated method for cyclists, joggers and other users includes one or more direction indicating elements and a cooperating sensor structured to sense the position of the direction indicating means such that when a direction indicating element is moved out of the sensing zones, the indicator is activated, and when the direction indicating element moves within the sensing zone, it is deactivated. In one embodiment, a pair of indicators is employed and may be used to indicate direction of intended movement of a cyclist.

39 Claims, 3 Drawing Sheets

DIRECTION INDICATOR SYSTEM

FIELD OF INVENTION

This invention relates to a direction indicator system in particular, but not limited thereto, for cyclists.

BACKGROUND OF INVENTION

Despite the introduction of a number of products in the market place designed to improve the visibility and safety of cyclists, road safety organisations in New Zealand remain concerned about the nature and extent of injuries and fatalities in the cycling population. Injuries and fatalities can occur particularly when the visibility of road cyclists is significantly compromised (between dusk and dawn and also on overcast days) and when cyclists change their direction of travel.

There are known lighting devices either mounted on the cycle or worn by a user that enhance the visibility of the cyclist to other road users. Whilst most of these devices illuminate the user, they do not necessarily indicate to other road users the direction or change of direction the user may take during the course of their travels.

It is known to provide indicating devices on a bicycle that are turned on and off using manual switching mechanisms and it is also known to provide similar indicating devices on a wearable garment. Although these devices can be used to indicate a particular direction of travel, they require manual switching to activate and deactivate the devices which could cause a user to become distracted which could lead to injury or even fatality.

Motorists particularly need to know what a cyclist is intending to do so that they can take appropriate action to avoid impact with the cyclist.

OBJECT OF THE INVENTION

It is an object of the invention to provide a direction indicator system that ameliorates some of the disadvantages and limitations of the known art or at least provide the public with a useful choice.

SUMMARY OF THE INVENTION

The term "user" or "users" mentioned throughout the specification includes, but is not limited thereto, cyclists and possibly joggers or other similar users.

In one aspect the invention resides in a direction indicator system including:
(i) direction indicating means adapted to indicate a desired direction of travel;
(ii) a sensor adapted to sense the position of the direction indicating means;

wherein, in use, when the sensor senses the direction indicating means within a sensing zone the direction indicating means is deactivated and when the direction indicating means is moved out of the sensing zone the direction indicating means is activated so as to indicate a desired direction of travel.

Preferably, the direction indicator means includes lighting means, preferably at least one incandescent lamp or light emitting diode or any other suitable lighting means.

Preferably, the direction indicator means are adapted to flash when activated.

Preferably, there are two direction indicating means provided, wherein a first direction indicating means is adapted to be situated on a first side of the sensor and a second direction indicating means situated on a second side of the sensor such that the first direction indicating means when activated indicates a desired first direction of travel and the second indicating means when activated indicates a second direction of travel.

Preferably, the second direction indicating means is situated on the opposite side of the sensor to which the first direction indicating means is situated.

Preferably, the direction indicating means are adapted to turn off automatically after a predetermined time period when the direction indicating means are out of the sensing zone.

Preferably, the sensor includes a housing with attachment means so that the housing is adapted to be attached via the attachment means to an object or a user, wherein the housing includes sensing means connected to a power source connected together by circuit means.

Preferably, the sensor is a wireless proximity sensor.

Preferably, the circuit means includes a printed circuit board, preferably a printed circuitry board.

Preferably, the sensing means are sensing coils.

Preferably, the power source of both the sensor and the direction indicating means is rechargeable.

Preferably, the power source is a rechargeable battery.

Preferably, the power source is a replaceable battery.

Preferably, the sensor includes two sensing means located in the housing and are spaced apart relative to one another, wherein each sensing means is adapted to sense a respective direction indicating means when said direction indicating means enters the sensing zone of the sensing means.

Preferably, the direction indicating means includes a sensor responsive means, a rechargeable power source, circuit means and lighting means.

Preferably, the lighting means are located on an outer circumference of the first and second direction indicating means.

Preferably, the direction indicating means is adapted to be worn by or attached to a user.

Preferably, the direction indicating means is adapted to be worn or attached on the wrist region of a user arm.

Preferably, the first direction indicating means is adapted to be worn or attached to the right wrist of a user and the second direction indicating means is adapted to be worn on or attached to the left wrist of the user, wherein, in use, movement of the right arm outwards away from the sensing zone of the sensor activates the first direction indicating means to indicate bearing right and movement of the left arm outwards away from the sensing zone of the sensor activates the second direction indicating means to indicate bearing left.

Preferably, the first and second direction indicating means are wrist bands or other similar wrist devices.

Preferably, the lighting means are located on the outer circumference of the wrist bands or other similar wrist devices.

Preferably, the object is a cycle, wherein the sensor is mounted on the handle bars of the cycle, preferably at a mid-point along the handles bars such that, whilst a users hands are on placed the handle bars, the first and second direction indicating means are deactivated due to the first and second direction indicating means being positioned within the sensing zone of the sensor.

Preferably, the second direction indicating means is spaced substantially the same distance as the first direction indicating means is spaced from the sensor when both the first and second direction indicating means are deactivated so that the sensing field within the sensing zone is balanced with respect to both the first and second direction indicating means.

Preferably, the sensor is adapted to be attached to a users apparel.

Preferably, the direction indicating means are adapted to be attached to and extend over an outer surface of the sleeves of apparel worn by a user.

Preferably, the sensor has a switch mechanism adapted to allow the direction indicator system to be turned off during daylight hours and turned on during night time hours or when visibility is poor.

Preferably, the switch mechanism includes a light sensitive means adapted to automatically turn on the direction indicator system when light intensity level falls below a predetermined level.

Preferably, the direction indicating means in the first instance are adapted to be powered up, when the sensor is initially switched on, by moving the direction indicating means across the sensor.

Preferably, the sensor includes a headlight that is adapted to be turned on by the switching mechanism when the light sensitive means senses the level of light intensity falling below said predetermined level.

In a second aspect the invention resides in a cycle direction indicator system for indicating a direction of travel by a cyclist, the cycle direction indicating system includes:
(i) direction indicating means adapted to be worn or attached to a cyclist;
(ii) a sensor adapted to be mounted to the cycle;
wherein, in use, when the sensor senses the direction indicating means within a sensing zone the direction indicating means are deactivated and when the direction indicating means are moved out of the sensing zone the direction indicating means are activated so as to indicate the cyclists desired turning direction.

In a third aspect the invention resides in a method for indicating to oncoming and/or following traffic of a users intended direction of travel, comprising the steps of:
(i) attaching direction indicating means to the arms of a user;
(ii) attaching a sensor to either a user or an object so that the sensor is positioned at a mid point region between the direction indicating means when direction indicating means are in a deactivated mode;
(iii) moving a users arm away from users body in an outward direction to indicate desired direction of travel and to cause the direction indicating means attached to said moved arm to move out of the sensing zone of the sensor so that the direction indicating means is activated to indicate desired direction of travel;
(iv) returning said moved arm toward users body so that as the direction indicating means enters the sensors sensing zone the direction indicating means is deactivated; and
(v) repeating steps (iii) and (iv) for each change of direction during travelling.

BRIEF DESCRIPTION OF THE DRAWINGS

Embodiments of the invention will now be described by way example to of the accompanying drawings.

DESCRIPTION OF THE INVENTION

Figure 1:
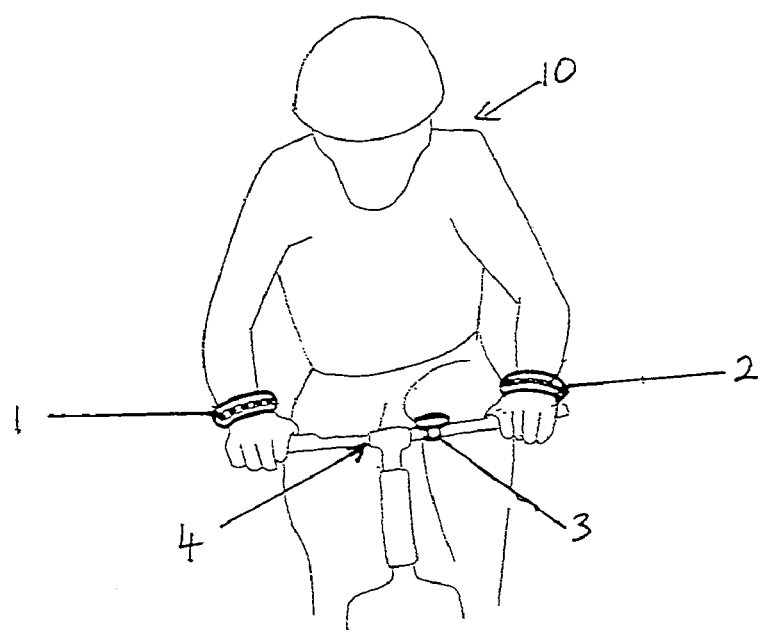
FIG. 1 is a front view of a cyclist utilising the direction indicator system in a deactivated mode in accordance with an embodiment of the invention.

Referring now to the drawings, which show a preferred embodiment of the invention, namely a direction indicating system for use with a cyclist and cycle. This particular embodiment is for purely illustrative purposes only and is no way intended to be limiting as other embodiments (not illustrated) are envisaged.

Turning to FIG. 1 there is shown the direction indicator system in use with a cyclist and cycle, preferably between dusk and dawn. However, it is envisaged that the direction indicator system could be used during daylight hours, especially when visibility is poor. The direction indicating system comprises a sensor 3 and direction indicating means 1 and 2. As shown in FIG. 1 the sensor 3 is mounted on the handle bars 4 of a cycle and the direction indicating means 1 and 2 (hereinafter "wrist devices") are attached to the wrist of a cyclist 10. The wrist devices 1 and 2 as shown in FIG. 1 are in the deactivated mode due to the sensor 3 sensing that wrist devices 1 and 2 are within a sensing zone.

As mentioned the sensor 3 is mounted on the handle bars 4. It is preferable that the sensor 3 is positioned on the handle bars 4 at a location that is equidistant from the hand gripping portions of the handle bars 4 so that the optimum sensing capabilities for the sensor 3 sensing each sensing unit can be obtained.

In another embodiment not shown the sensor 3 could equally be attached to part of the cyclists 10 apparel such as to a belt, jacket or helmet of the cyclist so as long as the position of the sensor 3 is centralised with respect to the wrist devices of the cyclist 10.

Figure 3:
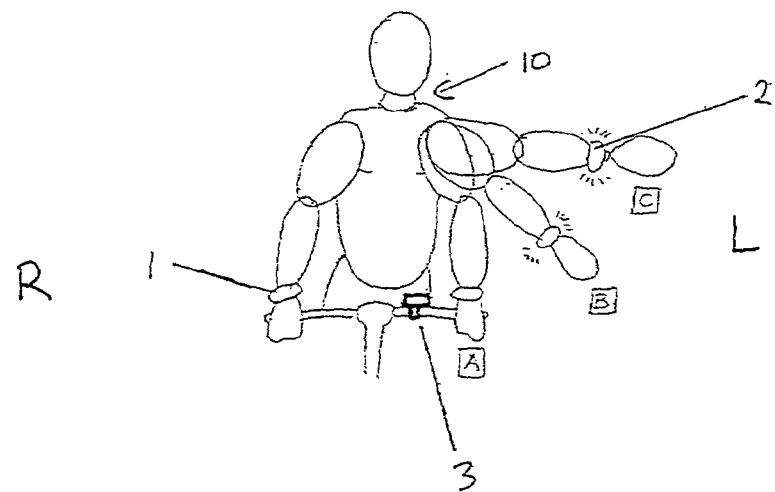
FIG. 3 is a front view showing varying stages of the direction indicator system in use in accordance with an embodiment of the invention.

Turning to FIG. 3, which shows the varying stages of the direction indicator system in use. A cyclist 10 initially riding the cycle in the usual manner with both hands on the handle bars 4.

When the cyclist wishes to make a change of direction which as shown in FIG. 3 is a turn to the left L, the cyclist 10 moves the left hand from position A on the handle bars outwards. As the left hand and left arm move outwards away from the cyclists body and the sensor 3, the left wrist device 2 moves out of the sensing zone the lighting means on the wrist device 2 are turned on, preferably begin to flash as shown in positions B and C.

After completion of the left turn as the left hand is returned to the position A and into the sensing zone the wrist device 2 is sensed by the sensor 3 and deactivated. Also, if for some reason the wrist device 2 is not returned to the position A after a predetermined time the wrist device is automatically deactivated. Similar operation applies when the cyclist wishes to turn right R.

Figure 2:
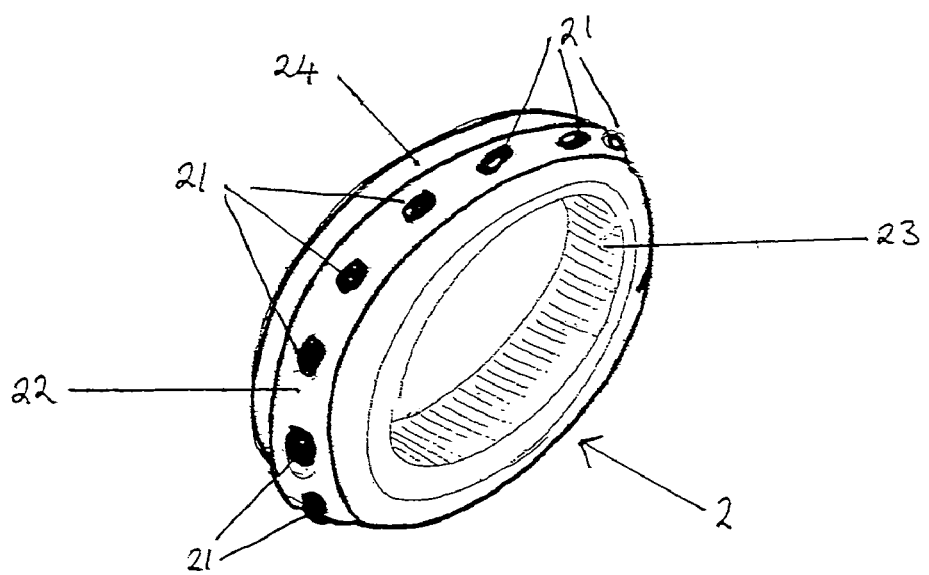
FIG. 2 is an isometric view of a direction indicator system in accordance with an embodiment of the invention.
Figure 5:
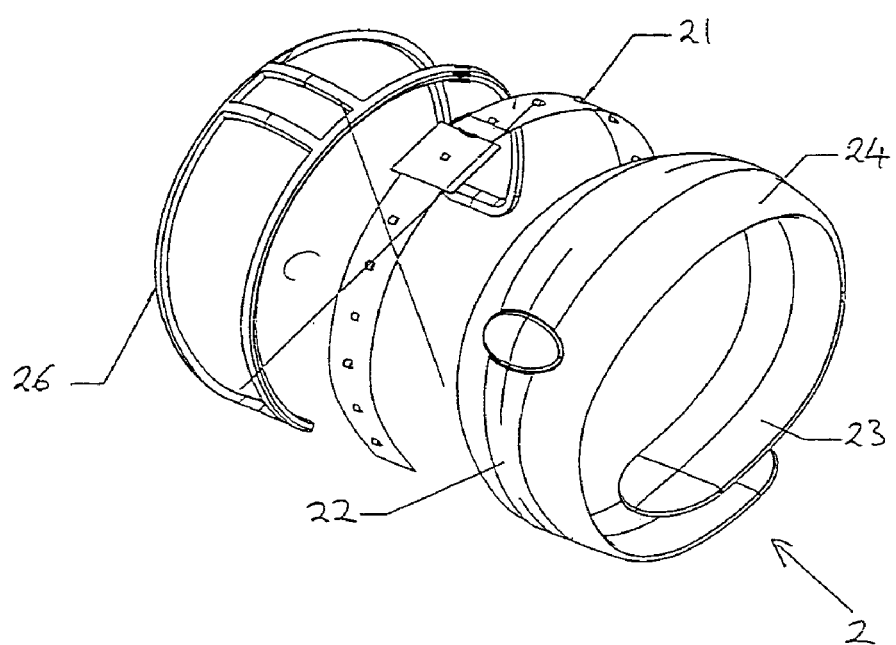
FIG. 5 is an exploded view of the direction indictor means in accordance with an embodiment of the invention.

Turning to FIGS. 2 and 5 where a preferred embodiment of the wrist devices is shown. The wrist device 2 is preferably of a band configuration, e.g. bracelet form. The wrist band has inner and outer shells 23, 24 which contain and protect the electronics and in which are also contained a lighting means 21, preferably a plurality of light emitting diodes 21 located around the circumference of the wrist band. A lens 22 which forms part of the outer shell 24 is situated over the light emitting diodes 21 so as to assist in illuminating and diffusing the light of the light emitting diodes 21 to enhance the visibility of the emitted light when the wrist device is in the activated mode. Preferably, the inner surface of the inner shell 23 has a comfort and elasticated strap to allow for comfort and for universal fitting.

The wrist device 2 also has pre-shaped sensing means 26, preferably sensor responsive coils, rechargeable batteries (not shown) and flexible circuitry (not shown).

Figure 4:
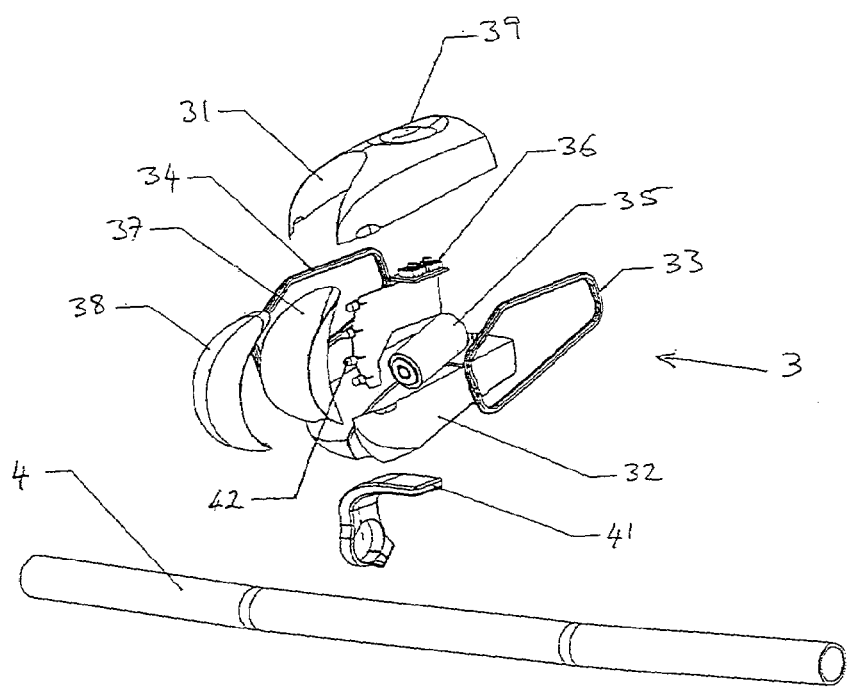
FIG. 4 is an exploded view of a sensor in accordance with an embodiment of the invention.

Turning to FIG. 4 there is shown an exploded view of the sensor 3. The sensor 3 is preferably a wireless proximity sensor. The sensor 3 is mounted to the handle bars 4 by a mounting pad 41. The mounting pad is preferably offset so that sensor 3 can be positioned centrally on the handle bars 4.

The sensor contains an upper and lower housing 31, 32. The mounting pad 41 is attachable to the lower housing 32.

Within the two housings 31, 32 there are located sensing coils 33, 34, rechargeable or replaceable battery 35, circuitry, printed circuit board 36 and on and off switch 39. It is also preferable that the sensor 3 can include a light source 42 in combination with a light reflector shield 37 and lens 38 that act as the front headlight for the cycle.

The second direction indicating means are to be spaced the same distance as the first direction indicating means is spaced from the sensor when both the first and second direction indicating means are deactivated so that the sensing field within the sensing zone is balanced with respect to both the first and second direction indicating means.

The sensor can be attached to users apparel. The direction indicating means can be attached to and extend over an outer surface of the sleeves of apparel worn by a user.

The sensor can have a switch mechanism adapted to allow the direction indicating system to be turned off during daylight hours and turned on during night time hours or when visibility is poor. However during night time hours or poor visibility once the system has been turned on then there is no need to activate any other switches to activate the direction indicators as the system does this automatically by the sensor and direction indicators. The switch mechanism may include a light sensitive means adapted to automatically turn on the direction indicator system when light intensity level falls below a predetermined level. The sensor can also include a headlight that is adapted to be turned on by the switching mechanism when the light sensitive means senses the level of light intensity falling below said predetermined level.

The wrist units, in the first instance, are powered up, when the sensor is initially switched on, by moving the wrist units across the sensor.

In another embodiment (not shown), the wrist devices 1 and 2 could be replaced with direction indicating means that are attached to and extend over an outer surface of the two arms of a jacket worn by the cyclist so that a greater area is visible for example to a motorist when the particular arm direction indicating means is not in a sensor zone and indicating a particular direction of travel. Also, it is envisaged that other users such as walkers, joggers and the like can use the direction indicating system to enhance their visibility at night time and indicate to oncoming and following traffic of their intended direction of travel especially when turning. For example, a jogger may place the sensor 3 on their belt or hat in a position centrally located between their wrists to which the direction indicators are attached.

ADVANTAGES no on off switch to activate direction indicators
automatic switching on/off function
improves visibility of intended direction to on coming traffic and following traffic
improves users safety
simple and easy to use.
multiple uses
multi-fit

VARIATIONS

Throughout the description of this specification the word "comprise" and variations of that word such as "comprises" and "comprising", are not intended to exclude other additive, components, integers or steps.

It will of course be realised that while the foregoing has been given by way of illustrative example of this invention, all such and other modifications and variations thereto as would be apparent to persons skilled in the art are deemed to fall within the broad scope and ambit of this invention as is herein set forth and claimed in the following claims.

What is claimed is:

1. A direction indicator system including:
   (i) a first direction indicating means adapted to be moved to and from a position indicating a first direction of travel;
   (ii) a second direction indicating means adapted to be moved to and from a position indicating a second direction of travel, and is able to move independently of the first direction indicating means;
   (iii) a sensor adapted to be attached to an object or an user, wherein the sensor is adapted to sense the position of each direction indicating means such that when the direction indicating means are within a sensing zone the direction indicating means are deactivated and when outside the sensing zone the direction indication means are activated; and further, wherein the first direction indicating means is adapted to be positioned adjacent to a first side of the sensor when within the sensing zone and the second direction indicating means is adapted to be positioned adjacent to a second side of the sensor when in the sensing zone; and that when the first direction indicating means is moved away from the sensor and out of the sensing zone the first direction indicating means is activated so as to indicate the first direction of travel and when the second indicating means is moved away from the sensor and out of the sensing zone the second direction indicating means is activated so as to indicate the second direction of travel.

2. The direction indicator system as claimed in claim 1 wherein the second direction indicating means is situated on the opposite side of the sensor to which the first direction indicating means is situated.

3. The direction indicator system as claimed in claim 2 wherein the second direction indicating means is spaced substantially the same distance as the first direction indicating means is spaced from the sensor when both the first and second direction indicating means are deactivated so that the sensing field within the sensing zone is balanced with respect to both the first and second direction indicating means.

4. The direction indicator system of claim 1 wherein the direction indicating means includes lighting means adapted to be activated when the direction indicating means are moved out of the sensing zone.

5. The direction indicator system as claimed in claim 4 wherein the lighting means is at least one incandescent lamp or at least one light emitting diode or at least one other suitable lighting means.

6. The direction indicator system as claimed in claim 4, wherein the lighting means are located on the outer circumference of the first and second direction indicating means.

7. The direction indicator system of claim 1 wherein the direction indicating means are adapted to flash intermittently when activated.

8. The direction indicator system of claim 1 wherein the direction indicating means are adapted to turn off automatically after a pre-determined time period when the direction indicating means are out of the sensing zone.

9. The direction indicator system of claim 1 wherein the direction indicating means includes a sensor responsive means, a power source, circuit means and lighting means.

10. The direction indicator system as claimed in claim 9 wherein the direction indicating means is adapted to be worn by or attached to a user.

11. The direction indicator system as claimed claim 10 wherein the direction indicating means is adapted to be worn on or attached to the wrist region of a users arm.

12. The direction indicator system of claim 10 wherein, the first direction indicating means is adapted to be worn or attached to the right wrist of a user and the second direction indicating means is adapted to be worn or attached to the left wrist of the user, wherein, in use, movement of the right arm outwards away from the sensing zone of the sensor activates the first direction indicating means to indicate bearing right and movement of the left arm outwards away from the sensing zone of the sensor activates the second direction indicating means to indicate bearing left.

13. The direction indicator system as claimed in claim 12 wherein the first and second direction indicating means are wrist bands or other similar wrist devices.

14. The direction indicator system as claimed in claim 9 wherein the power source of both the sensor and direction indicating means are rechargeable.

15. The direction indicator system as claimed in claim 14 wherein the power source is a rechargeable battery.

16. The direction indicator system as claimed in claim 9 wherein the power source is a replaceable battery.

17. The direction indicator system as claimed in claim 1 wherein the sensor includes a housing with attachment means so that the housing is adapted to be attached by the attachment means to an object or a user, and further wherein the housing includes sensing means connected to a power source connected together by circuit means.

18. The direction indicator system as claimed in claim 17 wherein the sensor is a wireless proximity sensor.

19. The direction indicator system as claimed in claim 17 wherein the circuit means includes a printed circuit board.

20. The direction indicator system as claimed in claim 19 wherein the printed circuit board is a printed circuitry board.

21. The direction indicator system as claimed in claim 17 wherein the sensing means are sensing coils.

22. The direction indicator system as claimed in claim 17 wherein the sensor includes two sensing means located in the housing which are spaced apart relative to one another, wherein each sensing means is adapted to sense a respective direction indicating means when said direction indicating means enters the sensing zone of the sensing means.

23. The direction indicator system as claimed in claim 17 wherein, the sensor is adapted to be attached to a users apparel.

24. The direction indicator system as claimed in claim 17 wherein the power source of both the sensor and direction indicating means are rechargeable.

25. The direction indicator system as claimed in claim 1, wherein the direction indicating means are adapted to be attached to and extend over an outer surface of the sleeves of apparel worn by a user.

26. The direction indicator system as claimed in claim 1 wherein the sensor has a switch mechanism adapted to allow the direction indicator system to be turned off during daylight hours and turned on during night time hours or when visibility is poor.

27. The direction indicator system as claimed in claim 26 wherein the switch mechanism includes a light sensitive means adapted to automatically turn on the direction indicating system when light intensity level falls below a predetermined level.

28. The direction indicator system as claimed in claim 27 wherein the sensor includes a headlight that is adapted to be turned on by the switching mechanism when the light sensitive means senses the level of light intensity falling below said predetermined level.

29. The direction indicator system as claimed in claim 26 wherein the direction indicating means, in the first instance, are adapted to be powered up, when the sensor is initially switched on, by moving the direction indicating means across the sensor.

30. The direction indicating system as claimed in claim 1, the direction indicating means is adapted to move independently relative to the sensor.

31. The direction indicating system of claim 1, wherein each direction indicating means and sensor are housed in separate housings whereby the direction indicating means housings are adapted to move independently relative to the sensor housing.

32. A direction indicator system including:
(i) two direction indicating means, a first direction indicating means adapted to be situated on a first side of the sensor and a second direction indicating means adapted to be situated on a second side of the sensor such that the first direction indicating means when activated indicates a desired first direction of travel and the second indicating means when activated indicates a second direction of travel; and
(ii) a sensor adapted to sense the position of the direction indicating means, the sensor including a housing with attachment means so that the housing is adapted to be attached by the attachment means to a set of handle bars of a, the housing further including sensing means connected to a power source connected together by circuit means wherein, in use, when the sensor senses the direction indicating means within a sensing zone the direction indicating means is deactivated and when the direction indicating means is moved out of the sensing zone the direction indicating means is activated so as to indicate the desired direction of travel, so that whilst a users hands are on the handle bars, the first and second direction indicating means are deactivated due to the first and second direction indicating means being positioned within the sensing zone of the sensor.

33. A cycle direction indicating system for indicating a direction of travel by a cyclist, the cycle direction indicator system includes:
(i) direction indicating means adapted to be worn or attached to a cyclist;
(ii) a sensor adapted to be mounted to the cycle; wherein, in use, when the sensor senses the direction indicating means within a sensing zone the direction indicating means are deactivated and when the direction indicating means are moved out of the sensing zone the direction indicating means are activated so as to indicate the cyclists desired turning direction.

34. A method for indicating to oncoming and/or following traffic of a users intended direction of travel, comprising the steps of:
(i) attaching direction indicating means to each arms of a user;
(ii) attaching a sensor to either a user or an object so that the sensor is positioned at a mid point region between each direction indicating means when each direction indicating means are in a deactivated mode;
(iii) moving a users arm away from users body in an outward direction to indicated a desired direction of travel and to cause the direction indicating means attached to said moved arm to move out of the sensing zone of the sensor so that the direction indicating means is activated to indicate desired direction of travel;
(iv) returning said moved arm toward users body so that as the direction indicating means attached to the moved arm enters the sensors sensing zone the direction indicating means is deactivated; and
(v) repeating steps (iii) and (iv) for each change of direction during traveling.

35. A direction indicator system including:
(i) a first direction indicating means adapted to be moved to and from a position indicating a first direction of travel;
(ii) a second direction indicating means adapted to be moved to and from a position indicating a second direction of travel, and is able to move independently of the first direction indicating means;
(iii) a sensor adapted to sense the position of each direction indicating means such that when the direction indicating means are within a sensing zone the direction indicating means are deactivated and when outside the sensing zone the direction indication means are activated; and further, wherein each direction indicating means is adapted to move independently relative to the sensor such that the first direction indicating means is moveable to a deactivated region within the sensing zone and proximate to a first side of the sensor and such that the first direction indicating means is moveable away from the sensor and out of the sensing zone to a first activated region allowing the first direction indicating means to indicate the first direction of travel, and such that the second direction indicating means is moveable to a deactivated region within the sensing zone and proximate to a second side of the sensor and such that the second direction indicating means is moveable away from the sensor and out of the sensing zone to a second activated region allowing the second direction indicating means to indicate the second direction of travel; and the sensor includes a housing with attachment means so that the housing is adapted to be attached by the attachment means to an object or a user, and further wherein the housing includes sensing means connected to a power source connected together by circuit means.

36. The direction indicating system of claim 35, wherein each direction indicating means and sensor are housed in separate housings whereby the direction indicating means housings are adapted to move independently relative to the sensor housing.

37. A direction indicator system including:
(i) at least one direction indicating means adapted to be moved to and from a position indicating a desired direction of travel;
(ii) a sensor adapted to be attached to an object or an user, wherein the sensor is adapted to sense the position of the direction indicating means such that when the direction indicating means is within a sensing zone the direction indicating means is deactivated and when outside the sensing zone the direction indication means is activated; and further, wherein the direction indicating means is adapted to move independently relative to the sensor such that the direction indicating means is moveable to a deactivated region within the sensing zone and proximate to the sensor and such that the direction indicating means is moveable away from the sensor and out of the sensing zone to an activated region allowing the direction indicating means to indicate the desired direction of travel.

38. The direction indicating system as claimed in claim 37, wherein the sensor includes a housing with attachment means so that the housing is adapted to be attached by the attachment means to the object or the user, and further wherein the housing includes sensing means connected to a power source connected together by circuit means.

39. The direction indicating system of claim 37, wherein the direction indicating means and sensor are housed in separate housings whereby the direction indicating means housing is adapted to move independently relative to the sensor housing.

* * * * *

UNITED STATES PATENT AND TRADEMARK OFFICE
CERTIFICATE OF CORRECTION

PATENT NO. : 6,992,572 B1
DATED : January 31, 2006
INVENTOR(S) : David Lovegrove It is certified that error appears in the above-identified patent and that said Letters Patent is hereby corrected as shown below:

Column 5,
Line 60, "Also," should start a new paragraph.

Column 8,
Line 49, delete "a,".

Column 9,
Line 9, "arms" should read -- arm --.

Signed and Sealed this

Thirtieth Day of May, 2006

JON W. DUDAS
*Director of the United States Patent and Trademark Office*